United States Patent
Foucher et al.

(10) Patent No.: US 8,443,460 B2
(45) Date of Patent: May 14, 2013

(54) METHOD AND STRUCTURE FOR CHARACTERISING AN ATOMIC FORCE MICROSCOPY TIP

(75) Inventors: Johann Foucher, Voreppe (FR); Pascal Faurie, Saint-Martin-le-Vinoux (FR)

(73) Assignee: Commissariat à l' énergie atomique et aux énergies alternatives, Paris (FR)

( * ) Notice: Subject to any disclaimer, the term of this patent is extended or adjusted under 35 U.S.C. 154(b) by 393 days.

(21) Appl. No.: 12/906,801

(22) Filed: Oct. 18, 2010

(65) Prior Publication Data

US 2011/0093990 A1 Apr. 21, 2011

(30) Foreign Application Priority Data

Oct. 19, 2009 (FR) ...................................... 09 57299

(51) Int. Cl.
*G01Q 40/00* (2010.01)
*G01Q 40/02* (2010.01)

(52) U.S. Cl.
USPC .............................................. 850/20; 850/19

(58) Field of Classification Search ............. 850/19, 850/20; *G01Q 40/00*
See application file for complete search history.

(56) References Cited

U.S. PATENT DOCUMENTS

| | | | | |
|---|---|---|---|---|
| 5,578,745 A | * | 11/1996 | Bayer et al. | 73/1.73 |
| 6,358,860 B1 | * | 3/2002 | Scheer et al. | 438/745 |
| 6,810,354 B1 | * | 10/2004 | Dahlen | 702/168 |
| 7,210,330 B2 | * | 5/2007 | Chand et a | 73/1.89 |
| 7,352,478 B2 | * | 4/2008 | Archie et al. | 356/625 |
| 2009/0106868 A1 | * | 4/2009 | Foucher et al. | 850/8 |
| 2010/0313312 A1 | * | 12/2010 | Dahlen et al. | 850/20 |

OTHER PUBLICATIONS

Martin, Yves et al.; "Method for imaging sidewalls by atomic force microscopy"; Appl. Phys. Lett. 64(19), May 9, 1994; American Institute of Physics, pp. 2498-2500.

* cited by examiner

*Primary Examiner* — Jack Berman
(74) *Attorney, Agent, or Firm* — Pillsbury Winthrop Shaw Pittman, LLP (57) ABSTRACT

A method for characterizing an atomic force microscopy tip using a characterization structure having two inclined sidewalls opposite one another and of which at least one actual lateral distance separating the two inclined sidewalls corresponding to a given height is known, the method including scanning the surfaces of the inclined sidewalls by the tip, the scanning being carried out while the tip oscillates solely vertically; measuring, for the given height, the lateral distance separating the two inclined sidewalls, the measurement incorporating the convolution of the shape of the tip with the shape of the characterization structure; and determining a characteristic dimension of the tip as a function of the measured lateral distance, and of the actual lateral distance.

13 Claims, 7 Drawing Sheets

METHOD AND STRUCTURE FOR CHARACTERISING AN ATOMIC FORCE MICROSCOPY TIP

CROSS-REFERENCE TO RELATED APPLICATIONS

This application is based upon and claims the benefit of priority from French Patent Application No. 09/57299, filed Oct. 19, 2009, the entire content of which is incorporated herein by reference.

The present invention relates to a method for characterising an atomic force microscopy tip and a characterisation structure for implementing said method.

Atomic force microscopy (or AFM) is a scanning microscopy technique which has been developed from the 1980s onwards and which makes it possible to achieve a resolution on an atomic scale. In contrast to scanning tunnelling microscopy, atomic force microscopy is not limited to forming images of conductive surfaces, which makes it particularly suitable for insulating materials, semi-conductors, as well as samples of a biological nature. This technique has applications in many fields such as the microelectronic industry or biology. The essential component of a conventional atomic force microscope is a probe consisting of a cantilever connected to a supporting end and provided, at the opposing end, with a tip oriented towards the surface or the object to be observed. The length of the cantilever is generally in the order of several tens or hundreds of micrometers, and the tip has a radius of curvature of several tens of nanometers. Such a probe, generally consisting of silicon, may be produced by conventional photolithographic techniques. When the tip of the probe is moved towards a surface, it is subjected to the influence of attractive or repelling forces of the chemical, "Van der Waals", electrostatic and/or magnetic type. When measuring these forces, whilst the tip scans the surface of the object to be observed, it is possible to reconstitute an image thereof. The measurement of the forces exerted between the tip and object may be carried out in different ways. According to the simplest and the oldest technique (static AFM), in particular by optical means, only the deflection of the cantilever fixed at one end and supporting the tip is observed. These optical means typically comprise a laser diode which illuminates a reflective surface of the cantilever at an oblique incidence and a detector which is sensitive to the position of the reflected beam which it receives and is thus capable of detecting the changes in orientation of the beam due to the deflections of the cantilever. Improved sensitivity may further be obtained by causing said cantilever to vibrate in one of its fundamental modes and observing the variations in resonance frequency caused by the force gradients (dynamic AFM). This vibration is caused by using a piezoelectric tube connected to the support.

Standard tips conventionally have conical shapes but it is understood that this type of tip only allows topographies without protuberances such as hills and valleys to be examined.

Figure 1:
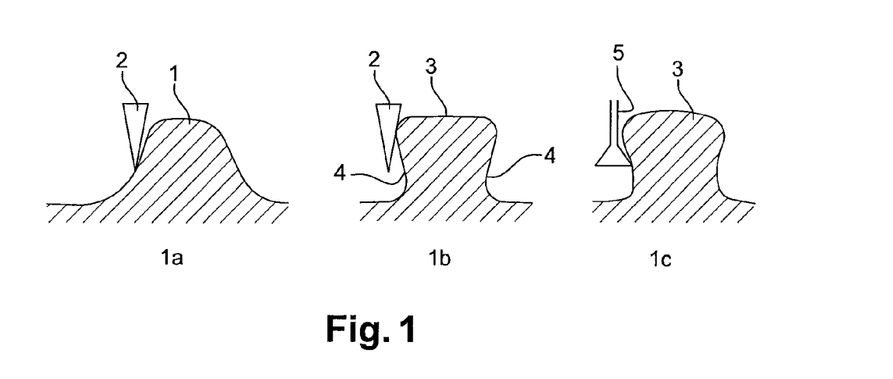
FIGS. 1a to 1c illustrate schematically the principle of examining a topography with two types of tip according to the nature of the topography analysed.

One known solution to this problem consists in utilizing tips of complex shape, known as CD ("Critical Dimension") tips, permitting dimensions of complex topographies to be measured and, in particular, topographies having protuberances. FIG. 1a shows by way of example the principle of examining a topography 1 without a protuberance by means of a simple conical tip 2. FIG. 1b illustrates the difficulty posed by examining a shape 3 with cavities or protuberances using this tip 2, which is not able to come into contact with the zones 4 beneath the protuberances. FIG. 1c shows the principle of examining a topography having protuberances using a flared CD tip 5 of complex shape (which is elephant's foot-shaped at the flared end to come into contact with the topography beneath the protuberance). The structure of the flared tip 5 makes it possible to examine complex topographies with protuberances.

Both for simple tips and for complex tips, the problem which is posed is that of integral characterisation (of the shape and dimensions) of the tip used. This characterisation stage is essential for the precision and reproducibility of the measurements.

In the known manner, the characterisation of a CD tip of complex shape permitting three-dimensional characterisation of objects is carried out using two separate characterisation structures made of silicon, the first structure making it possible to determine the overall diameter of the tip, the second structure making it possible to determine its shape.

Figure 2A:
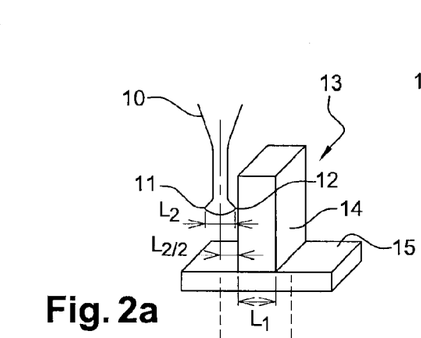
FIGS. 2a to 2d illustrate a known method for determining the overall diameter of a flared tip of complex shape.
Figure 2B:
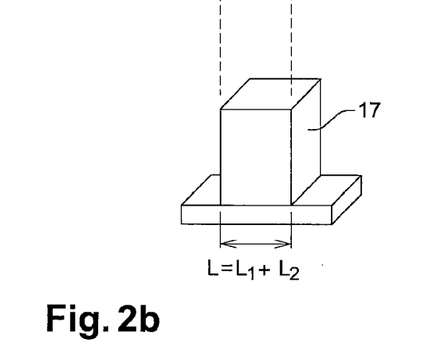
Figure 2C:
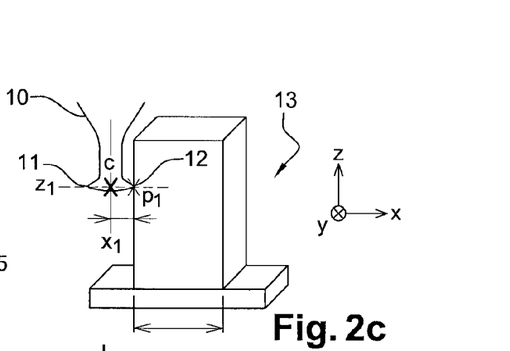
Figure 2D:
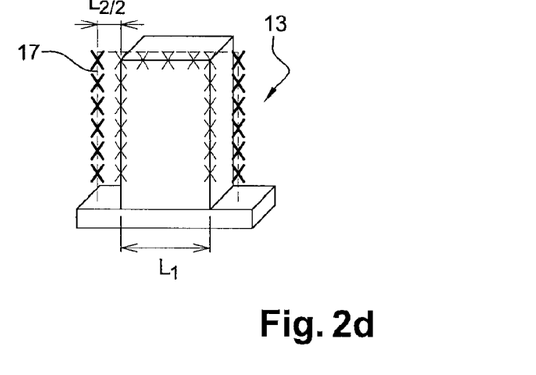

FIGS. 2a to 2d illustrate the manner of determining the overall diameter of a flared tip 10 of complex shape. This tip 10 of complex shape comprises two lateral protruding tips 11 and 12 and has a section which is generally circular or elliptical. The overall diameter of the tip 10 corresponds to the width L2 separating the two lateral tips 11 and 12 protruding from one another; in other words, the overall diameter of the tip corresponds to the largest diameter of all the horizontal sections of the tip 10. The first structure 13, which permits the diameter of the tip to be determined, consists of a line 14 made of silicon having relatively smooth vertical sidewalls rising above a surface 15 made of silicon. The characterisation structure 13 is also denoted by the acronym VPS ("Vertical Parallel Structure"). As the width L1 of the line 14 of this VPS structure has been previously calibrated, said structure serves to determine the overall diameter of the tip. More specifically, as the dimension L1 of the line 14 is known, if this structure 13 is scanned (or swept) by the tip 10 of complex geometry, a line 17 is obtained, after the measurement, of which the virtual size L (see FIG. 2b) is the sum of the width L1 of the line 14 and the actual width of the tip L2. This is known as convolution of the tip 10 with the calibration structure 13 (i.e. from the moment when a probe is used to measure the dimension of any object, the dimension of the external envelope of the probe is incorporated in the measurement). The displacement contour followed by the tip 10 is thus a rectangle of which the width L is not L1 but L1+L2. Thus one may deduce therefrom the absolute size of the tip L2=L−L1. More specifically, if the point of contact p1 is considered between the tip 10 and the structure 13 at a height z1 (see FIG. 2c) the x coordinate retained is the coordinate x1 corresponding to an offset of a half-diameter L2/2 relative to the edge of the structure (the frame of reference or point of reference of the AFM measurement is actually the centre C of the circular or elliptical section passing through the two projecting tips 11 and 12). For reasons of symmetry, the same applies to the other side of the structure at the same height z1. By scanning the entire calibration structure 13 at x and z in this manner, (see FIG. 2d) at the end of the measuring process, the rectangular shape of the virtual line 17 shown in FIG. 2b is obtained, corresponding to the convolution of the tip 10 with the calibration structure 13, of which the final width obtained is L=L1+L2. Thus the diameter of the tip L2=L−L1 is deduced therefrom.

Figure 3A:
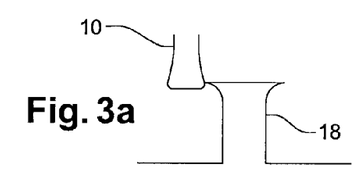
FIGS. 3a to 3c illustrate a known method for determining the shape of a flared tip of complex shape.
Figure 3B:
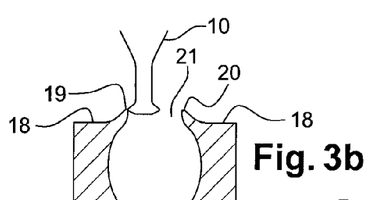
Figures 3C, 4A, 4B:
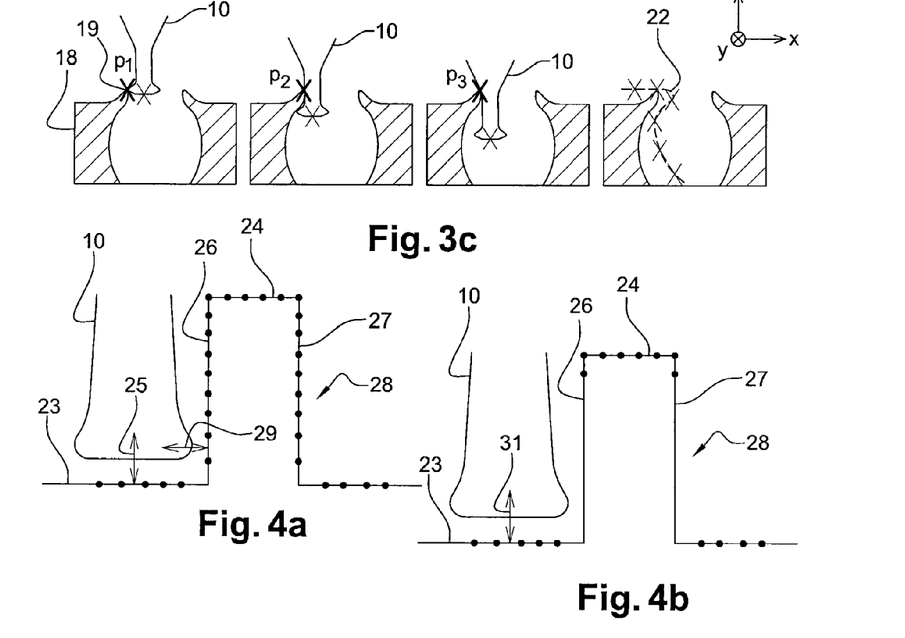
FIG. 4a illustrates the principle of the CD scanning mode.
FIG. 4b illustrates the principle of the DT scanning mode.

FIGS. 3a to 3c illustrate the manner of determining, imaging and characterising the left and right sides of a flared tip 10 of complex geometry and thus of obtaining the shape of this tip in a quantitative manner using characteristic variables by means of a second characterising structure 18 shown in FIG. 3a. FIG. 3b shows respectively the right and left parts of two characterisation structures 18 arranged side-by-side and forming a cavity 21. The structure 18, known as the IFSR structure ("Isolated Flared Silicon Ridge") has a vertical re-entrant profile. In order to obtain a very accurate reconstruction of the shape of the tip 10, it is very important that the different regions of the tip 10 are in contact with the characterisation structure 18. Ideally, this point of contact will be unique for each of the sides of the tip. The key stage is thus creating the two points of contact between the structure and the tip which permit the integral characterisation of the geometry of the tip. To obtain two contact points which are virtually point contacts, the edges 19 and 20 of the structures 18 are slightly raised and narrowed to obtain radii of curvature of less than 10 nm (see FIG. 3b). The points of contact between the tip 10 and the structure 18 may thus be considered to be virtually point contacts. The contour followed by the tip 10 during its displacement makes it possible to determine the shape of the tip (by deconvolution with the shape of the cavity and its protuberances). The reconstitution of the tip is illustrated in FIG. 3c. At a specific point of contact $p_i$ (i variant from 1 to 3, in the example of FIG. 3c) between the tip and the end 19 of the characterisation structure 18 corresponds a pair of coordinates $(x_i, z_i)$. By passing the tip 10 through the entire characterisation structure 18, it is thus possible, by representing all these pairs of coordinates, to determine the shape of the left-hand side of the tip 10 (see curve 22). The same operation is carried out symmetrically on the right-hand side of the tip 10. The reconstitution of the shape is thus made by determining a succession of coordinates $(x_i, z_i)$ of the points of contact as the tip is gradually displaced in the cavity 21, and it is the curve formed by this succession of coordinates which is the object of the deconvolution. The end 19 or 20 of the rising part of the characterisation structure 18 which permits the contact between the tip and said characterisation structure has to be extremely narrow in order for the contact to be a point contact as far as possible. Without this, the accuracy and reproducibility of the measurement may not be of high quality.

It will be noted that for the two characterisation structures (structure 13 shown in FIG. 2a and structure 18 shown in FIG. 3a), the sampling of the measurements of the contour has to be sufficient (typically at least one point per nanometer) to ensure sufficient reconstitution accuracy.

The scanning mode (in all cases denoted by the term "scan" hereinafter) which is most frequently used for the flared AFM tip of complex shape for measuring a three-dimensional object is the CD ("Critical Dimension") mode. Generally, the tip is controlled by a piezoelectric tube in the three spatial directions and may oscillate horizontally and vertically. As illustrated in FIG. 4a, the flared tip 10 may thus scan the planar and substantially horizontal surfaces 23 and 24 of the pattern 28 by oscillating vertically (double arrow 25) and scan the substantially vertical sidewalls 26 and 27 of the same pattern 28 by oscillating horizontally (double arrow 29). The feedback is produced over the amplitude of the cantilever of the tip. The operating principle is the same for vertical and horizontal oscillation, by observing variations in resonance frequency caused by force gradients sustained by the tip in contact with the surface. The advantage of the CD mode is to be able to scan the sidewalls of the patterns accurately, due to the horizontal oscillation.

Figure 5A:
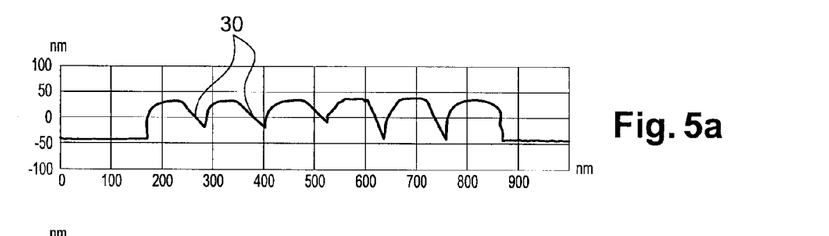
FIG. 5a shows a measurement of narrow trenches obtained by scanning in CD mode.

The CD mode, however, has certain drawbacks when it is desirable to characterize very narrow trenches. More specifically, during horizontal oscillation, the tip 10 may abut against the other sidewall during the measurement of the first sidewall. Such contact of the tip against a sidewall opposing the sidewall to be measured will naturally interfere with the measurement. This phenomenon is illustrated in FIG. 5a which shows the profile of a series of narrow trenches (each having a width in the order of approximately forty nanometers) measured in CD mode using a flared tip having a diameter in the order of approximately thirty nanometers. It is clearly understood that a diameter of 30 nm oscillating horizontally in a trench of 40 nm runs the risk of producing a faulty measurement; to this end, FIG. 5a shows interruptions 30 in the profiles which do not absolutely correspond to the profiles of the actual trenches to be measured (both in terms of depth and shape of the sidewalls to be measured).

Figure 5B:
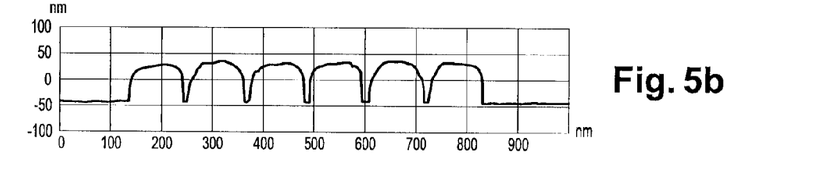
FIG. 5b shows a measurement of narrow trenches obtained by scanning in DT mode.

One known solution to this problem consists in using a DT ("Deep Trench") type scanning mode. In this mode, the tip, of which the resonance frequency is the same as in CD mode (typically around 30 kHz) only oscillates vertically. As a result, it is able to scan narrower trenches than the CD mode. This phenomenon is illustrated in FIG. 5b which shows the profile of a series of narrow trenches (each having a width in the order of approximately forty nanometers) measured in DT mode using a flared tip having a diameter in the order of approximately thirty nanometers. As illustrated in FIG. 4b, the flared tip 10 may thus scan the planar and substantially horizontal surfaces 23 and 24 of the pattern 28, by oscillating vertically (double arrow 31); in contrast, it is not able to scan the substantially vertical sidewalls 26 and 27 of the same pattern 28. It is noteworthy that both for the DT mode and for the CD mode, the scanning frequency is not fixed (versus the so-called "tapping" mode in which a scanning frequency is imposed and which does not permit measurements to be obtained which are as accurate as the CD or DT modes). Only the sampling frequency is imposed. In other words, it is expected during each measurement that the tip returns to its fundamental oscillation, not disrupted by the influence of the attractive or repelling forces generated when approaching the surface. In the document "Method for imaging sidewalls by atomic force microscopy" (Appl. Phys. Lett. 64(19), 9 May 1994), a description is found of the two modes DT (denoted by the term 1D in this document to indicate the oscillation of the tip in one spatial dimension) and CD (denoted by the term 2D in this document to indicate the oscillation of the tip in two spatial dimensions).

The DT mode also has, however, certain difficulties. Thus the main drawback is the fact that, without controlling the horizontal oscillation of the tip, the sidewalls 26 and 27 at 90° may not be scanned. Thus, the VPS characterisation structure shown in FIG. 2a may not be used. More specifically, if the DT mode is used to carry out a measurement, it is appropriate to use the same mode during the characterisation of the tip for coherency and not to produce a measurement offset between the characterisation of the tip and the measurement of a structure.

It will be noted, moreover, that a VPS characterisation structure used in CD mode is obviously not adapted to standard tips of the conical or cylindrical type.

In this context, the object of the present invention is to provide a method for characterising an atomic force microscopy tip making it possible to characterise with accuracy any type of AFM tip (which is flared and of complex, conical or cylindrical shape) in DT mode.

To this end, the invention provides a method for characterising an atomic force microscopy tip by means of a characterisation structure having two inclined sidewalls opposing one another and of which at least one actual lateral distance separating said two inclined sidewalls corresponding to a give height of said structure is known, said method comprising the following steps:

scanning the surfaces of said inclined sidewalls of said structure by said tip, said scanning being carried out whilst said tip oscillates solely vertically;

measuring, for said given height h, the lateral distance separating said two inclined sidewalls, said measurement incorporating the convolution of the shape of said tip with the shape of said characterisation structure;

determining a characteristic dimension of said tip as a function of said measured lateral distance and of said actual lateral distance.

By "tip oscillating solely vertically" is understood an AFM tip operating in DT mode.

By "convolution" is understood the incorporation of the dimension of the external envelope of the tip in the measurement which has been carried out. The measurement incorporating the convolution is thus not an actual measurement of the dimension of the characterisation structure.

As a result of the invention, advantageously the VPS characterisation structure (structure with vertical sidewalls) is replaced by a structure with inclined sidewalls so that the tip, oscillating solely vertically, may scan the slope. This characterisation structure with inclined sidewalls has at least one known width, connecting the inclined sidewalls for a given height (width and height obtained by calibration of the structure, for example by a calibration tip operating in CD mode). Then this pair (width, height) of actual dimensions in addition to the AFM measurement of the characterisation structure carried out at the same given height is used to determine a characteristic dimension of the AFM tip; this characteristic dimension may typically be the overall diameter of the tip in the case of a flared tip (largest diameter of all the horizontal sections of the tip), the diameter of the tip in the case of a cylindrical tip (diameter of the horizontal circular section) or the radius of curvature of the end of the tip in the case of a conical tip. In the case of an elliptical section, the diameter is replaced by the large axis of the ellipse.

By repeating the method according to the invention over time, it is thus possible to monitor the wear of the tip to be characterised.

The method according to the invention allows very accurate characterisation, to a few angstroms, of AFM tips in DT mode which makes it possible to obtain improved accuracy of measurement when a structure is measured using this mode (in fact it is necessary to deconvolute at least the diameter of the tip to obtain an accurate measurement).

The method according to the invention makes it possible, moreover, to characterise all types of tips: flared, cylindrical or conical tips, whilst the known characterisations in CD mode solely permit the characterisation of flared tips.

Finally, characterising a tip in DT mode is a scanning mode which is more rapid than the CD mode. This makes it possible, therefore, to improve the efficiency of the measuring equipment in a manufacturing context.

The method according to the invention may also have one or more of the following features, taken in isolation or according to any of the combinations which are technically possible:

said at least one actual lateral distance between the inclined sidewalls at a given height is determined by an atomic force microscopy measurement carried out by means of a calibration tip which is different from the tip to be characterised, said calibration tip being a flared tip of complex shape of known dimensions and shape and oscillating horizontally and vertically (by "flared tip" is understood a tip of complex shape, in the shape of an elephant's foot, with a flared end comprising two lateral protruding tips of circular or elliptical section);

said measurement is carried out for a plurality of given heights, each height corresponding to a known actual lateral distance separating said inclined two sidewalls;

said characteristic dimension is:
the largest diameter of all the horizontal circular sections of the tip in the case of a flared tip to be characterised of complex shape;
the diameter of the horizontal circular section of the tip in the case of a cylindrical tip;
the radius of curvature of the end of the tip in the case of a conical tip;

said diameter is obtained by subtracting the actual lateral distance separating said two inclined sidewalls corresponding to a given height from the measured lateral distance separating said two inclined sidewalls for said same height;

said measurement is repeated over time so as to monitor the evolution of said characteristic dimension as a function of time.

The subject of the present invention is also a structure for characterising the tip of an atomic force microscope for implementing the method according to the invention, said structure being produced on a substrate and comprising a first sidewall inclined by an angle θ strictly between 0 and 90° relative to the principle plane of the substrate and a second sidewall inclined by the same angle as said first sidewall relative to the principle plane of the substrate, said first and second sidewalls being opposite one another.

The structure according to the invention may also have one or more of the following features, taken in isolation or according to any of the combinations which are technically possible:

In a particularly advantageous manner, the structure according to the invention comprises:

a first element having an upper base substantially parallel to the substrate and a lower base substantially parallel to the substrate, said first and second inclined sidewalls joining the upper base to the lower base;

a second element located below said first element and above said substrate, said second element having substantially vertical sidewalls;

the joins between said first and second inclined sidewalls and the lower base forming two parts protruding by an opening angle θ.

Such an arrangement makes it possible to use one and the same structure to characterise the diameter and the shape of the tip; this provides a gain in time which is not inconsiderable by minimising the number of scanning lines to be implemented; thus it will be noted that one of the drawbacks of the known method for characterisation and disclosed with reference to FIGS. 2a to 2d and 3a to 3c is that it requires two different characterisation structures (VPS and IFSR) and that the incertainty regarding the measurement of the shape is the combination of the incertainties associated with each of the structures.

According to a particularly advantageous embodiment, said first element is made in a first material and said second element is made in a second material which is different from said first material so that said first and second materials are capable of being etched selectively relative to one another. More specifically, it is noteworthy that the protuberances which rise up from the IFSR structures are difficult to produce, in particular with a radius of curvature of less than 10 nm. More specifically, a radius of curvature which is too great does not permit an exact reconstruction of the shape of the tip to be reached during deconvolution. The structure according to the invention may be produced by carrying out the conventional steps in microelectronics of lithography and etching.

Thus, using two materials which may be etched very selectively relative to one another during the etching steps, for producing the upper and lower parts of the structure according to the invention, makes it possible to obtain "sharp" angles on both sides of the structure in order to obtain a more detailed characterisation of the shape of the tips.

Said first material may be Si or SiGe.

Said first material and said second material may be respectively selected from one of the following pairs:

Si for the first material and SiGe for the second material;
SiGe for the first material and Si for the second material;
Si for the first material and $SiO_2$ for the second material.

Advantageously, the height of said second element is selected so that it is greater than the height of the useful part of the tip to be characterised.

Preferably, in the case of a structure according to the invention for characterising the tip of an atomic force microscope of conical shape, the angle $\theta$ is selected so as to be less than $90°-\theta_1$, where $\theta_1$ is the opening angle of the cone.

Preferably, the height of the part with inclined sidewalls is selected so as to be strictly greater than the radius of curvature of the tip to be examined.

Further features and advantages of the invention will emerge clearly from the following description, by way of indication and in a non-limiting manner, with reference to the accompanying figures, in which.

In all the figures, common elements carry the same reference numerals.

FIGS. 1a to 5b have already been disclosed above with reference to the prior art.

Figures 6, 7:
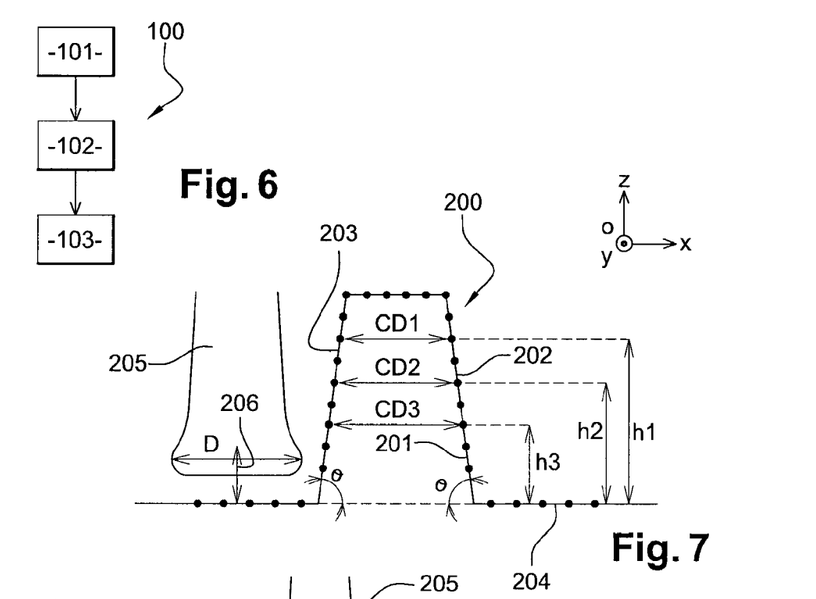
FIG. 6 shows the different steps of the method according to the invention.
FIG. 7 shows the operating principle of a characterisation structure for implementing the method according to the invention.

FIG. 6 shows the different steps of the method 100 according to the invention.

The method according to the invention is a method permitting an AFM tip which may have different shapes (of flared, conical or cylindrical shape) to be characterised; more specifically, as mentioned above with reference to the prior art, a measuring mode known as DT ("Deep Trench") exists in atomic force microscopy which is particularly efficient for measuring narrow trenches in contrast with the CD ("Critical Dimensions") type mode, in which the measuring tip oscillates both vertically and horizontally. In the DT mode, the tip oscillates solely vertically. The object of the method according to the invention is to make it possible to characterise efficiently and rapidly a measuring tip in DT mode (for information, if the measurement is carried out with a tip in DT mode, this tip has to have been characterised in DT mode so as not to generate a measurement offset between the characterisation of the tip and the measurement of a structure to be characterised).

The method according to the invention uses a characterisation structure 200 as shown in FIG. 7. Hereinafter, reference is made to an orthonormal coordinate (Oxyz), the plane (Oxz) being the plane of the sheet and the plane (Oxy) being the horizontal plane. This structure 200 of substantially trapezoidal shape comprises a part 201 provided with two relatively smooth inclined sidewalls 202 and 203, rising above a surface 204, the two inclined planes 202 and 203 being opposite one another. By "inclined sidewalls" 202 and 203 is understood two substantially smooth surfaces forming an angle $\theta$ strictly between 0 and 90° with the horizontal surface 204 parallel to the plane (Oxy).

The first step 101 of the method 100 consists in determining a plurality of lateral dimensions (in this case three lateral dimensions CD1, CD2 and CD3) each corresponding to a height along the z-axis of the structure 200 (in this case three heights h1, h2 and h3 corresponding respectively to the lateral dimensions CD1, CD2 and CD3). By "lateral dimension" is understood the distance along the x-axis separating the inclined planes 202 and 203: in other words, the dimensions CD1, CD2 and CD3 correspond to the widths of the structure 200 at the different given heights h1, h2 and h3. These pairs of data (CD1, h1), (CD2, h2) and (CD3, h3) may be determined by an AFM measurement in CD mode using a flared tip (not shown) of complex shape, known as the calibration tip, of which the dimensions and the shape are fully known. This calibration tip is used very little so as to avoid wear (and to maintain constant dimensions and shape) and to make it possible to determine in a very precise manner the dimensions of the structure to be characterised.

The second step 102 of the method 100 consists in carrying out an AFM measurement of the structure 200 with a tip 205 to be characterised. It will be noted that the tip 205 shown in FIG. 7 is a flared tip of complex shape but the method according to the invention also applies to tips of conical type or cylindrical type (which is not the case of characterisation structures according to the prior art of the VPS type which do not permit conical or cylindrical tips to be characterised). Here, the tip 205 scans the surface of the structure 200 oscillating solely vertically (along the arrow 206 oriented according to the axis Oz).

According to one step 103 of the method 100 according to the invention, at a given height h (for example h1), the width of the structure is measured; thus the sum is obtained of the width of the structure CD1 and of the diameter D of the tip (the so-called convolution of the tip 205 and of the structure 200); from this value is subtracted the actual width (in this case CD1) of the structure 200 obtained for the given height h1. Thus the diameter D is deducted from the tip 205. It is naturally advantageous to obtain several series of measurements at different given heights even if a single pair (CD1, h1) enables the diameter D of the tip to be determined. Preferably a width CD1 located at a raised height, a width CD2 located at a median height and a width CD3 located at a low height could be selected.

Thus this tip 205, of which the diameter D is accurately known, may be used to make a certain number of measurements of nanometric structures in DT mode. In order to monitor the wear of the tip 205 during the measurements, this characterisation step of the diameter of the tip 205 is thus repeated. Thus the wear of the tip over time is monitored in "real time".

Figure 7A:
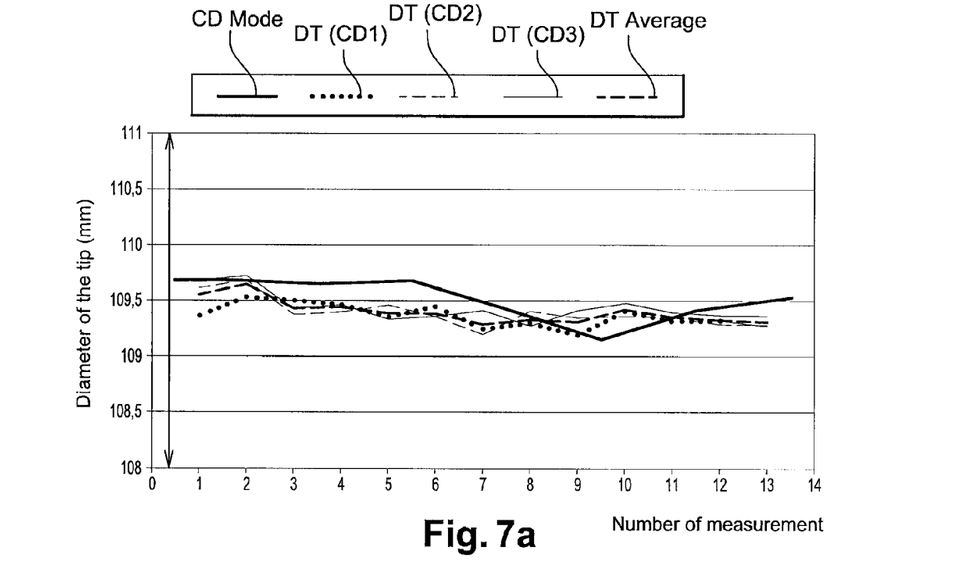
FIGS. 7a and 7b show the evolution of the diameter of a tip to be characterised according to the number of measurements.
Figure 7B:
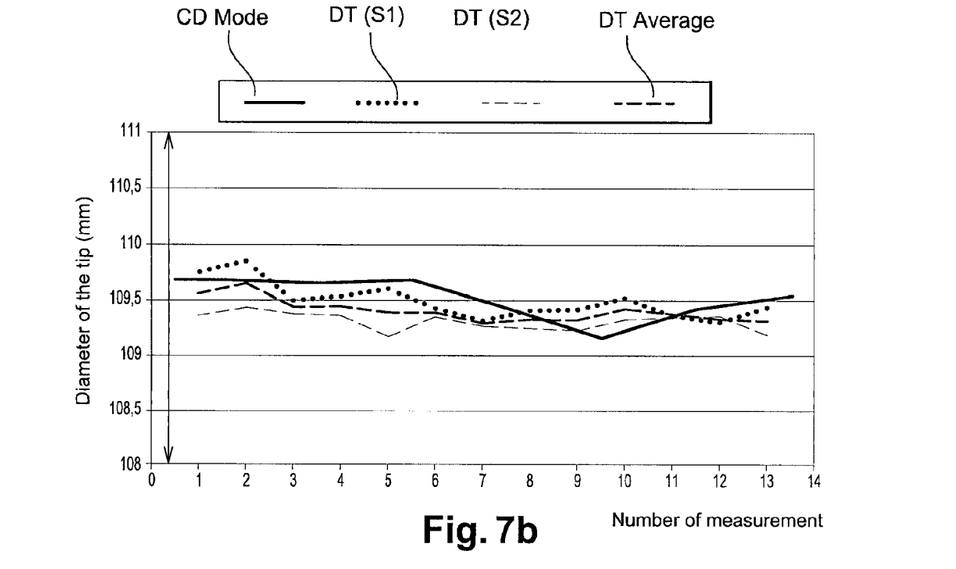

In order to validate the method 100 of characterisation using the structure 200, FIGS. 7a and 7b show the evolution of the diameter of a tip in nanometers during the course of the measurements. At the same time as the characterisation of this tip in DT mode on an inclined structure, the characterisation values have been shown of the diameter obtained using the CD mode on a standard vertical VPS structure. The object is to show the relevance of the diameter obtained on an inclined structure in DT mode. So that this characterisation also operates in CD mode, a flared tip has been used (thus able to be characterised both on a vertical structure, which is not the case for a cylindrical or conical tip, and on an inclined structure according to the invention). In FIG. 7a, the characterisation of the tip has been carried out 12 times in DT mode on an inclined structure such as the structure 200, taking into account the diameters obtained from the different values CD1 (average diameter=109.4 nm), CD2 (average diameter=109.4 nm) and CD3 (average diameter=109.4 nm) and on a VPS structure in CD mode (average diameter=109.5 nm).

FIG. 7a also shows the average of the three curves obtained respectively for CD1, CD2 and CD3 (average diameter=109.4 nm).

In FIG. 7b, the characterisation of the tip has been carried out 12 times in DT mode on two structures S1 (average diameter=109.5 nm) and S2 (average diameter=109.3 nm) according to the invention and having different dimensions and on a VPS structure in CD mode (average diameter=109.5 nm).

FIG. 7b also shows the average of the two curves obtained respectively for S1 and S2 (average diameter=109.4 nm).

Thus it is observed that it is quite possible to obtain very good results in all the cases of the figures. The diameters obtained on an inclined structure in DT mode are very consistent with those obtained in CD mode on a vertical structure. The great advantage is that this method for characterisation is applicable not only for flared tips but also for cylindrical and conical tips, which is not the case in CD mode (which is incompatible with cylindrical and conical tips).

It will be noted that the method 100 according to the invention shown in FIG. 6 and illustrated with reference to FIG. 7 makes it possible to determine in DT mode the diameter of the tip to be characterised; as such, it does not permit the shape of this tip to be determined. At this stage, two solutions are possible.

Figure 8A:
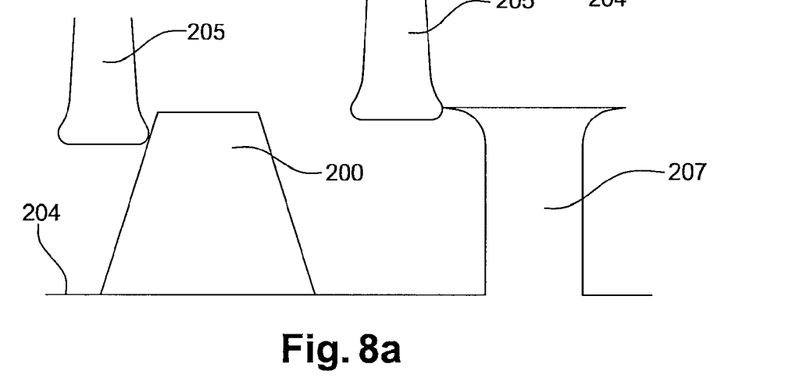
FIG. 8a shows a first embodiment of a characterisation structure according to the invention.

The first solution consists in using a standard IFSR structure 207 as shown in FIG. 8a (complementing the structure 200 according to the invention) to determine the shape of the tip 205.

Figure 8B:
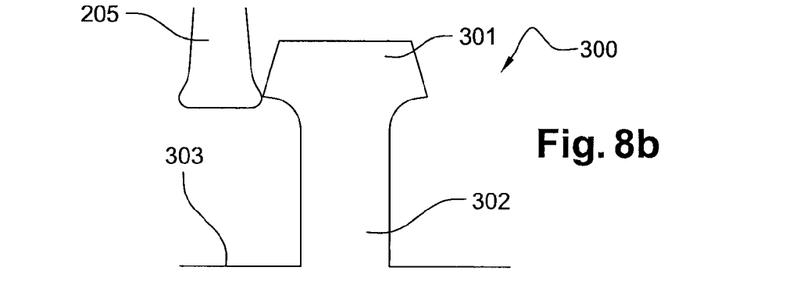
FIG. 8b shows a second embodiment of a characterisation structure according to the invention.

A second solution consists in using a single structure 300 as illustrated in FIG. 8b to determine both the diameter and the shape of the flared tip 205. The single structure 300 comprises a first element 301 which is substantially identical to the structure 200 of FIGS. 7 and 8a and a second element 302 arranged below from the first element 301 and having the shape of an IFSR structure. All the first and second elements are arranged on a substrate 303. As already mentioned above, it is very important to obtain two points of contact, which are virtually point contacts, for the edges 306 and 307 of the structure 302 to obtain the smallest possible radii of curvature. It will be seen hereinafter that by using a structure according to the invention incorporating both the element 301 making it possible to obtain the diameter of the tip and the element 302 making it possible to obtain the shape of the tip it is possible to improve, in particular, the degree of contact which is virtually a point contact and which is particularly useful for the accuracy of measurement.

Figure 9:
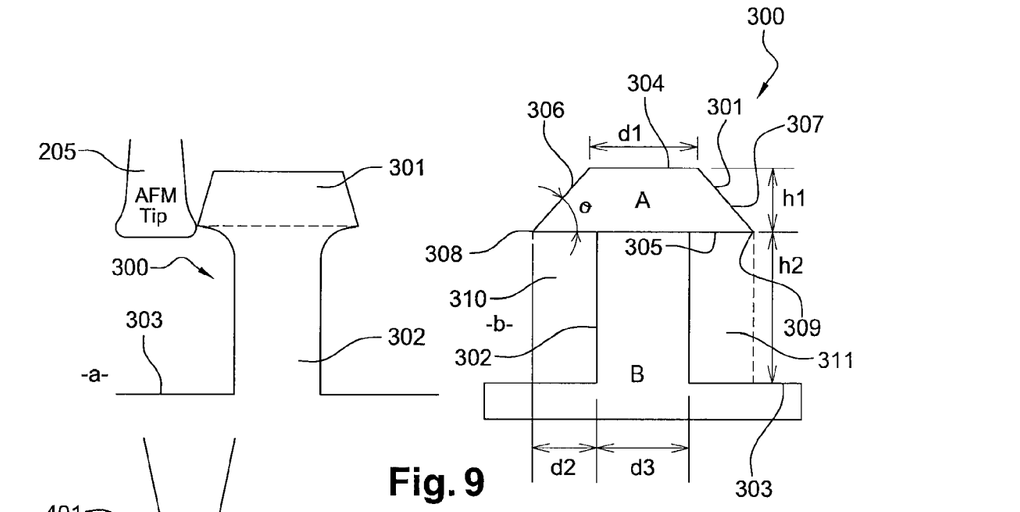
FIGS. 9a and 9b illustrate the principle of producing a structure as shown in FIG. 8b.

To this end, FIGS. 9a and 9b illustrate the principle of implementing such a structure. In FIG. 9a is shown the single structure 300 as illustrated in FIG. 8b and in FIG. 9b, a schematic representation of the different elements of this same structure 300.

The first element 301 of trapezoidal shape and height h1 comprises:
   an upper base 304 of width d1 substantially parallel to the horizontal substrate 303;
   a lower base 305 substantially parallel to the substrate 303;
   a first and second inclined sidewall 306 and 307 joining the upper base 304 to the lower base 305.

The joins between the first and second inclined sidewalls 306 and 307 and the lower base 305 form two parts 308 and 309 protruding by the opening angle θ.

The second element 302 of height h2 located below the first element 301 and above the substrate 303 is formed by a wall (or line) of width d3 having vertical sidewalls. The width d3 of the second element 302 is less than the width of the lower base 305, said second element 302 being substantially centred beneath the lower base so that the first element 301 covers on both sides of the second element 302 two zones 310 and 311 of width d2 without material (re-entrant profile of the structure 300).

Preferably, the structure 300 is produced using two materials A and B which are different for the first element 301 (made using the material A) and the second element 302 (made using the material B). The materials A and B are selected so as to be able to be etched very selectively relative to one another during the steps of plasma etching.

For example, a pair of materials could be selected, such as:
      the pair Si (A or B) and SiGe (B or A) which may be etched selectively,
      Si (A) and SiO2 (B) which may also be etched selectively.

Preferably, the first element 301 used for determining the diameter of the tips to be characterised is made of Si or SiGe.

By using selective materials A and B it is possible to obtain "sharp" angles θ on both sides of the structure in order to obtain a more detailed characterisation of the shapes of the tips. The two parts 308 and 309 protruding by the opening angle θ are used to determine the shape of the tip. The points of contact (308 and 309) between the tip to be characterised and the structure 300 may thus be considered as point contacts. The contour followed by the tip during its displacement thus makes it possible to determine the shape of the tip by deconvolution.

Typically, the width d1 of the upper base 304 is closely associated with the width d2 of the re-entrant zones 310 and 311. d1 is also greater than the width d3 of the second element 302 (residual width of the structure 300 after lateral etching equivalent to d2). In fact, for reasons of mechanical behaviour, the width d3 is not much less than the width d2. Typically the width d1 is equal to 3 times the width d2 and d2 is greater than the half-diameter of the tip. For example, if it is desired to characterise the shape of a flared tip which has a diameter of 120 nm using the points of contact 308 and 309, it will be necessary to provide a width d2 which is greater than 60 nm (for example 70 nm). In this case, the width d1 is typically equal to three times d2, namely 210 nm.

Similarly, the height h1 of the first element 301 of the structure 300 determines the quality for determining the diameter of the tips. This height h1 is in fact greater than the radius of curvature Rc of the tips to be characterised so as to have sufficient characteristic points of the diameter of the tip on the sidewalls of the structure. Typically, Rc is in the order of 20 nm. Thus a height h1 in the order of 80 nm to 100 nm is selected.

The opening angle θ may also be adapted of the two parts 308 and 309 protruding between the first and second inclined sidewalls 306 and 307 and the lower base 305, in particular in view of improving the quality of characterising cylindrical and conical tips.

For a cylindrical tip, it suffices that the angle is strictly less than 90° (typically between 80° and 85°).

Figure 10:
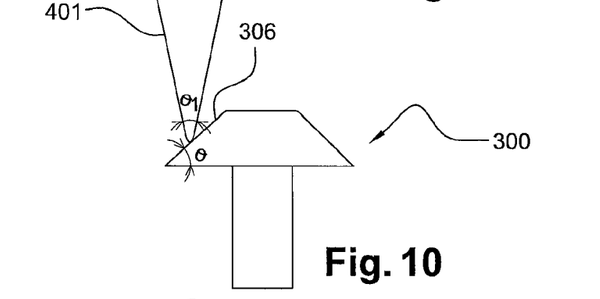
FIG. 10 illustrates the principle of using a structure according to the invention for a conical tip.

As illustrated in FIG. 10, for a conical tip 401 having an opening angle θ1, the angle θ has to be less than (90°-θ1) in order to preserve the contact of the sidewall 306 with the end of the tip 401.

Figure 11:
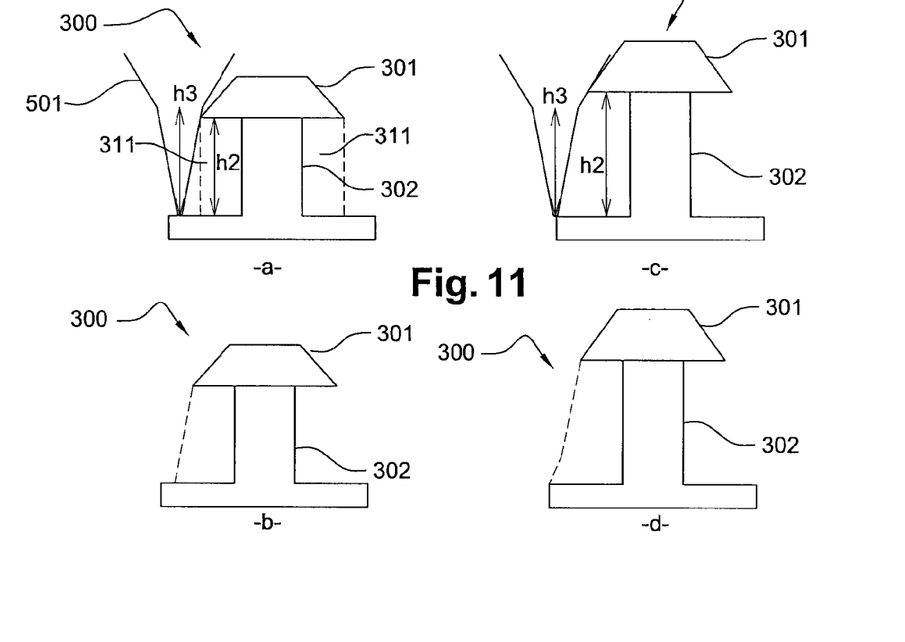
FIGS. 11a to 11d illustrate different configurations of the structure according to the invention as a function of the useful height of the tip to be characterised.

Finally, the height h2 of the second element is preferably fixed relative to the useful height h3 of the tip to be characterised. More specifically, the purpose of the re-entrant zones 310 and 311 of the structure 300 is to characterise the shape of the tip and thus, amongst others, its useful length h3. As FIGS. 11a and 11b show, if the height h2 is less than the useful length h3 of the tip (in this case a conical tip 501) it will thus be impossible to monitor the wear of the tip 501 in two dimensions. It will only be possible to monitor the wear of the diameter and not the wear of the useful length h3. In contrast, in the case of FIGS. 11c and 11d, the height h2 of the structure is greater than the useful length h3 which makes possible the characterisation of this length and thus the monitoring of the wear over time of this length.

Figure 12:
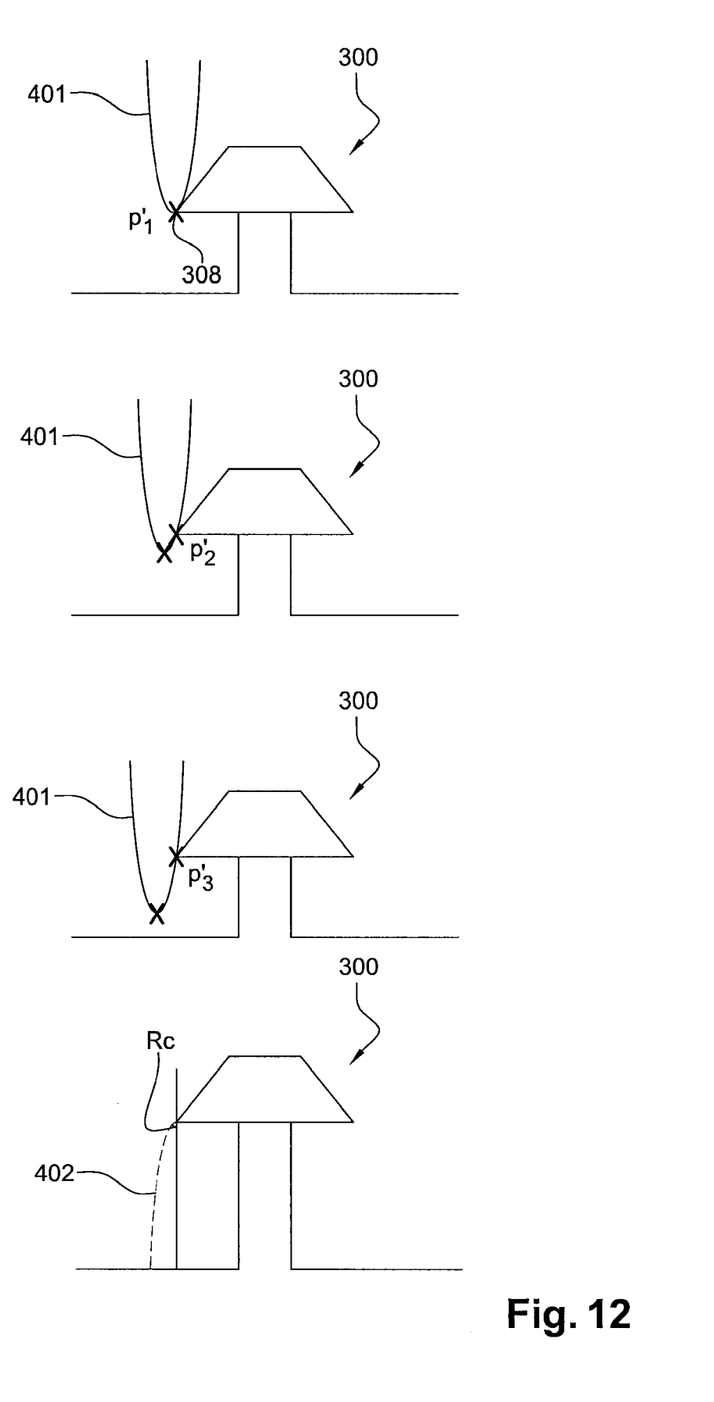
FIG. 12 illustrates a method for reconstituting the shape of a conical tip and for ascertaining its radius of curvature with a structure according to the invention.

FIG. 12 illustrates the manner of reconstituting the shape of a conical tip 401 and thus the possibility of ascertaining its radius of curvature Rc with a structure 300 according to the invention.

The point of contact 308 between the conical tip 401 and the structure 300 may be considered as a point contact. The contour followed by the tip 401 during its displacement makes it possible to determine the shape of the conical tip 401. A pair of coordinates $(x_i, z_i)$ corresponds to a precise point of contact p'i (i variant from 1 to 3 in the example of FIG. 12) between the conical tip 401 and the tip 308 of the characterisation structure 300. By passing the tip 401 through the entire characterisation structure 300, it is thus possible, by representing all the pairs of coordinates, to determine the shape of the right-hand side of the tip 401 (see curve 402). The same operation is carried out symmetrically on the left-hand side of the tip 401. The reconstitution of the shape is thus made by determining a succession of coordinates $(x_i, z_i)$ of the points of contact during the gradual displacement of the conical tip 401 in contact with the tip 308. Once the curve 402 is obtained, it is possible to determine in a simple manner the radius of curvature Rc from the conical tip 401.

Figure 13:
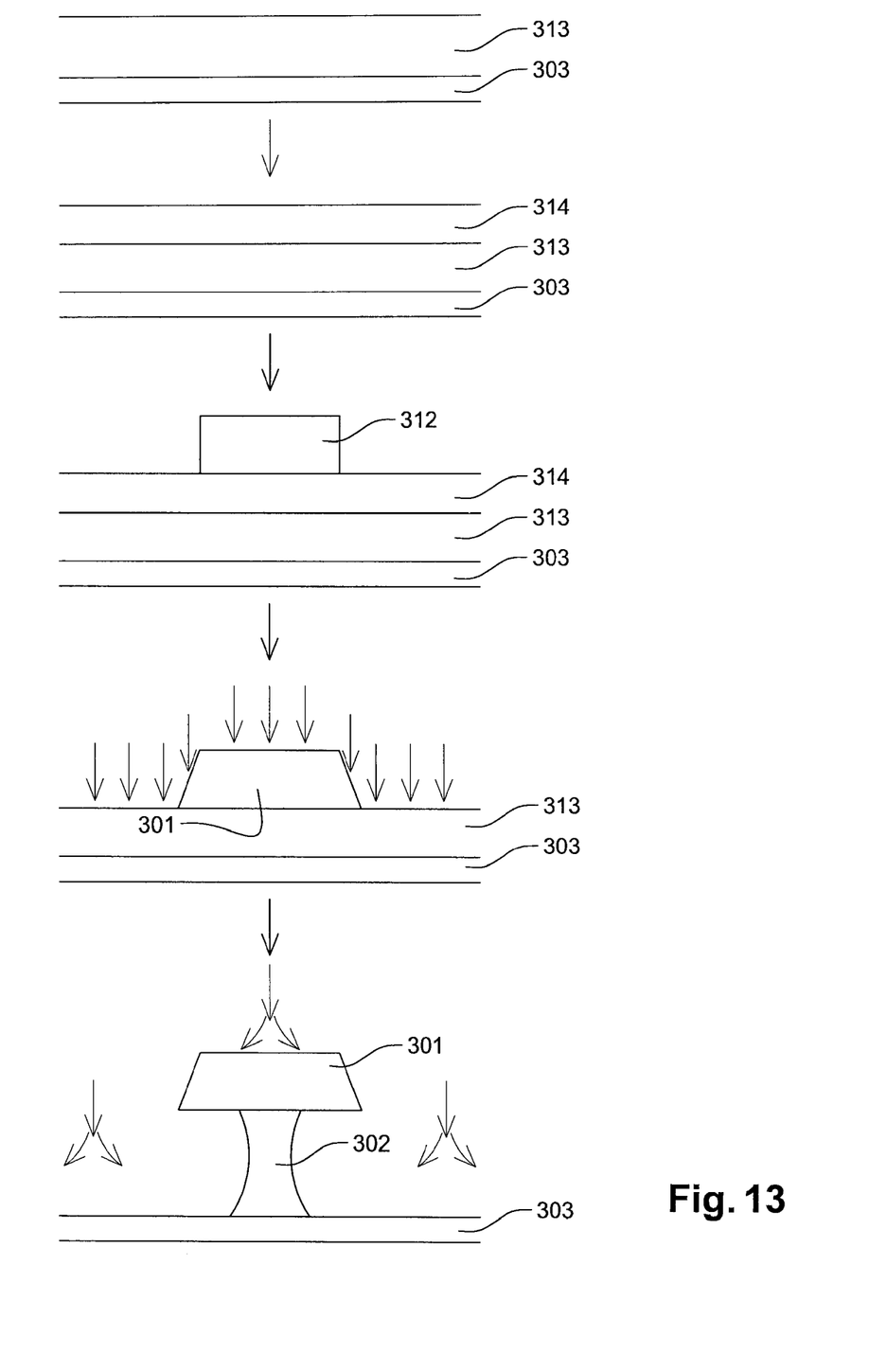
FIG. 13 illustrates schematically the different steps of an example of the method for implementing a structure according to the invention.

The structure 300 according to the invention may be obtained by the conventional steps of lithography and plasma etching which are carried out in the semi-conductor industry. FIG. 13 illustrates schematically the different steps of an example of the method for implementing such a structure 300. Typically one starts with the substrate 303 on which a layer 313 of the material B is deposited, then a layer 314 of the material A is deposited.

Then a step of photolithography is carried out using a mask 312 so as to obtain a pattern in the material A.

Then anisotropic etching is carried out on the material A (selective relative to material B) with controlled slopes so as to obtain the first trapezoidal element 301, then isotropic etching is carried out on the material B (selective relative to material A) so as to obtain the second element 302 having the shape of an IFSR structure.

The invention claimed is:

1. A method for characterizing an atomic force microscopy tip using a characterization structure on a substrate, the characterization structure having two inclined sidewalls relative to a plane of a surface of the substrate, said inclined sidewalls opposing one another, and of which at least one actual lateral distance, parallel to the plane of the surface of the substrate and separating said two inclined sidewalls corresponding to a given height of said structure, is known, said method comprising:

scanning surfaces of said inclined sidewalls of said structure by said tip, said scanning being carried out while said tip oscillates solely vertically, perpendicular relative to the plane of the surface of the substrate;

measuring, for said given height, the lateral distance parallel to the plane of the surface of the substrate, separating said two inclined sidewalls, said measurement incorporating a convolution of the shape of said tip with the shape of said characterization structure;

determining a characteristic dimension of said tip as a function of said measured lateral distance, and of said actual lateral distance.

2. The method according to claim 1, wherein said at least one actual lateral distance between the inclined sidewalls at a given height is determined by an atomic force microscopy measurement carried out using a calibration tip which is different from the tip to be characterized, said calibration tip being a flared tip of complex shape of known dimensions and shape and oscillating horizontally and vertically.

3. The method according to claim 1, wherein said measurement is carried out for a plurality of given heights, each height corresponding to a known actual lateral distance separating said two inclined sidewalls.

4. The method according to claim 1, wherein said characteristic dimension is:

a largest diameter of all horizontal circular sections of the tip for a flared tip to be characterized of complex shape;

a diameter of a horizontal circular section of the tip for a cylindrical tip;

a radius of curvature of the end of the tip for a conical tip.

5. The method according to claim 4, wherein said diameter is obtained by subtracting the actual lateral distance separating said two inclined sidewalls corresponding to a given height from the measured lateral distance separating said two inclined sidewalls for said same height.

6. The method according to claim 1, wherein said measurement is repeated over time so as to monitor the evolution of said characteristic dimension as a function of time.

7. A structure for characterizing the tip of an atomic force microscope for implementing the method according to claim 1, said structure being produced on a substrate and comprising a first sidewall inclined by an angle θ strictly between 0 and 90° relative to a principal plane of the substrate and a second sidewall inclined by the same angle as said first sidewall relative to the principal plane of the substrate, said first and second sidewalls being opposite one another, said structure comprising:
- a first element having an upper base substantially parallel to the substrate and a lower base substantially parallel to the substrate, said first and second inclined sidewalls joining the upper base to the lower base;
- a second element located below said first element and above said substrate, said second element having substantially vertical sidewalls, the joins between said first and second inclined sidewalls and the lower base forming two parts protruding by an opening angle $\theta$.

8. The structure according to claim 7, wherein said first element is made of a first material and said second element is made of a second material which is different from said first material so that said first and second materials are capable of being etched selectively relative to one another.

9. The structure according to claim 8, wherein said first material is Si or SiGe.

10. The structure according to claim 9, wherein the first material and the second material are respectively selected from one of the following pairs:
  Si for the first material and SiGe for the second material;
  SiGe for the first material and Si for the second material;
  Si for the first material and $SiO_2$ for the second material.

11. The structure according to claim 7, wherein a height of said second element is selected so as to be greater than a height of a useful part of the tip to be characterized.

12. The structure according to claim 7, for characterizing the tip of an atomic force microscope of conical shape, wherein the angle $\theta$ is selected so as to be less than $90°-\theta_1$ where $\theta_1$ is the opening angle of the cone.

13. The structure according to claim 7, wherein the height of the part with inclined sidewalls is selected so as to be strictly greater than a radius of curvature of the tip to be examined.

* * * * *